United States Patent Office 3,183,071
Patented May 11, 1965

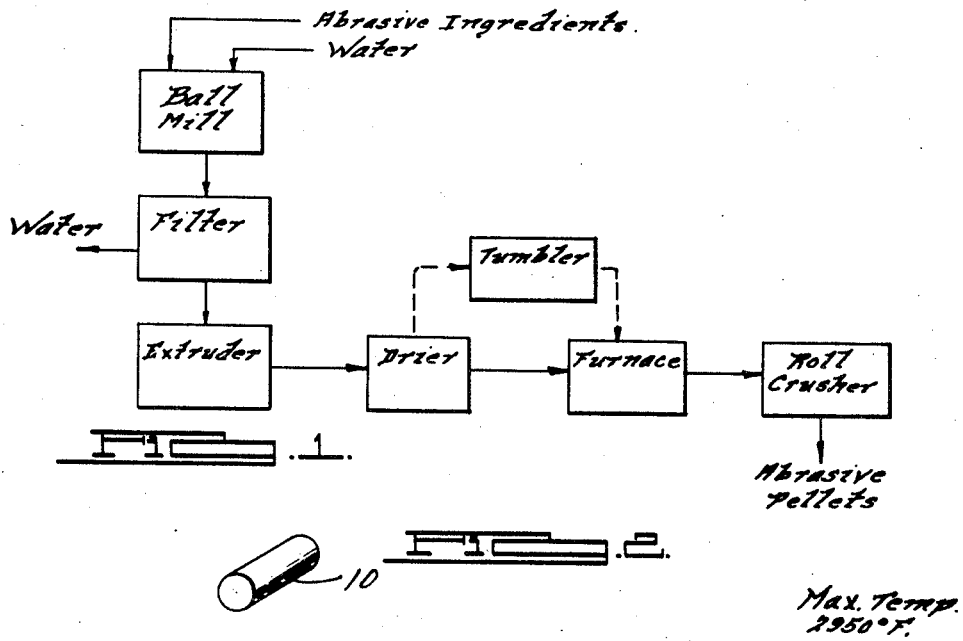
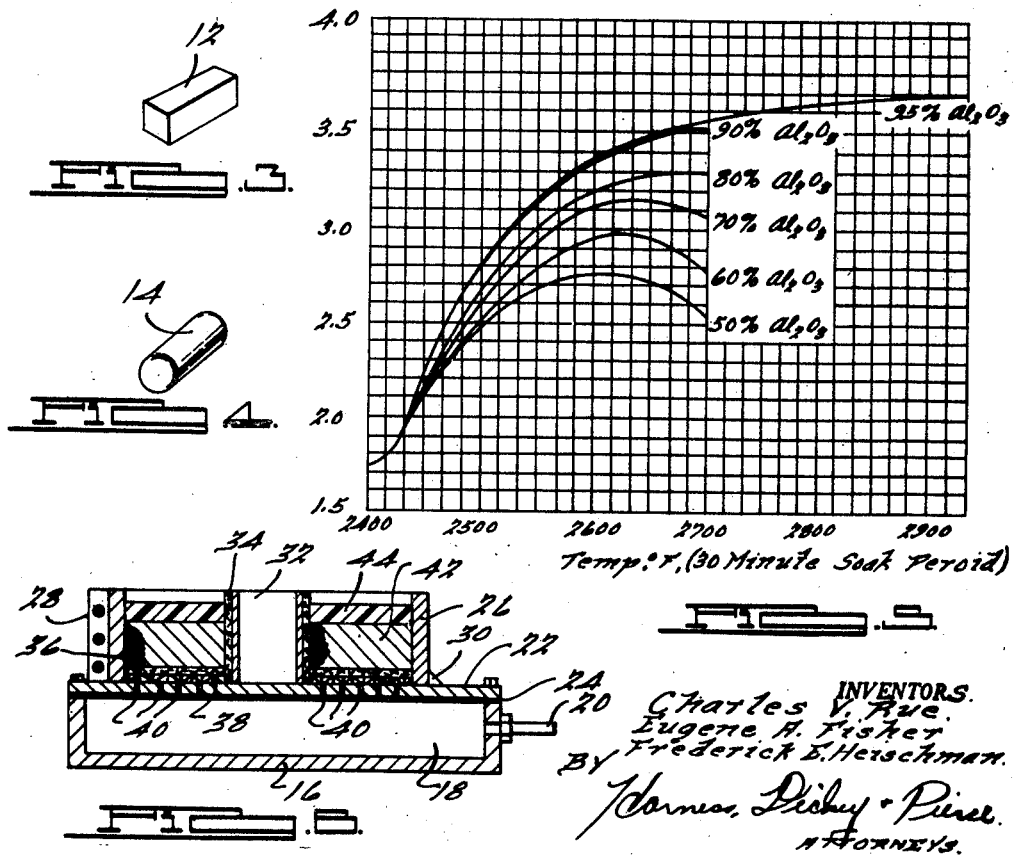

3,183,071
ABRASIVE ARTICLE
Charles V. Rue, Seneca County, and Eugene A. Fisher and Frederick E. Heischman, Hancock County, Ohio; said Rue assignor to Wakefield Corporation, Detroit, Mich., a corporation of Michigan; said Fisher and Heischman assignors to The Electric Auto-Lite Company, Toledo, Ohio, a corporation of Ohio
Filed June 19, 1961, Ser. No. 118,158
15 Claims. (Cl. 51—298)

The present invention broadly relates to abrasive articles and more particularly to an improved abrasive pellet and articles made therefrom and which abrasive pellets comprise fine sized crystalline alumina particles tenaciously bonded to each other. The invention also encompasses an improved method for making the abrasive pellets and articles incorporating the abrasive pellets.

The abrasive grains or pellets comprising the present invention are suitable for the manufacture of abrasive articles, and particularly of grinding wheels of the heavy-duty type employed for snagging operations such as snagging iron castings and the like. A variety of abrasive grains have heretofore been employed for the manufacture of heavy-duty snagging wheels including silicon carbide and fused aluminum oxide. Abrasive grains of the alumina type heretofore available are subject to the disadvantages of not possessing optimum uniformity, toughness, hardness, and micro structure to achieve optimum grinding efficiency. In addition it is too difficult to modify the physical properties of the alumina type abrasive grains heretofore known, in order to best adapt them to a specific abrasive operation. Moreover, the alumina type abrasive grains heretofore available have been conventionally produced by fusing bauxite or Bayer alumina and thereafter crushing and screening the resultant pig or brick to achieve the desired abrasive particle sizes. The practice of crushing the pig or brick after fusing is characterized by its waste in producing a large quantity of unusable fines. Crushing also produces abrasive grains having an uncontrolled irregular and slivery shape which are of relatively poor physical characteristics and include internal stresses and incipient cracks therethrough which substantially lower their physical properties and usefulness as abrasive particles.

It is a primary object of the present invention to provide an improved alumina abrasive particle having a presized and preshaped configuration and comprising a continuous vitreous bonding phase and a discontinuous alumina phase which comprises extremely fine sized crystals of alumina which are extremely hard and have excellent physical characteristics.

Another object of the present invention is to provide an improved abrasive particle containing extremely fine sized crystals of alumina and which particle is presized and preshaped prior to firing and is devoid of internal stresses and incipient cracks present in alumina abrasive grains of the types heretofore known.

Still another object of the present invention is to provide an improved abrasive wheel particularly suitable for high speed and high pressure heavy-duty grinding operations which incorporates alumina abrasive particles of a controlled shape, size, and composition, and which grinding wheel is of high strength and high cutting efficiency.

A further object of the present invention is to provide a unique method for making alumina abrasive particles which are of a controlled size, shape, and composition, and which are characterized by their improved physical characteristics and the absence of residual stresses and incipient cracks therein.

A still further object of the present invention is to provide an improved process for making alumina abrasive particles wherein the particles are presized and preshaped prior to firing thereby overcoming the disadvantages heretofore present in alumina abrasive particles derived from the crushing of relatively large sized pigs or bricks of abrasive material.

Other objects and advantages of the present invention will become apparent from the following detailed description taken in conjunction with the accompanying drawings, wherein:

FIGURE 1 is a schematic flow sheet of the basic steps employed in making the abrasive pellets comprising the present invention;

FIGS. 2 and 3 are perspective views of typical cylindrical and prismatic pellets, respectively, made in accordance with the process schematically shown in FIGURE 1;

FIG. 4 is an abrasive pellet which has been subjected to a tumbling operation prior to firing;

FIG. 5 is a graph illustrating the variations in pellet density as a function of temperature and composition; and FIG. 6 is a transverse vertical sectional view of a mold containing the abrasive pellets comprising the present invention for making a resinoid bonded grinding wheel.

The abrasive grains, or pellets, comprising the present invention have a composition which broadly comprises from about 50% to about 95% aluminum oxide and from about 5% to about 50% of a vitreous bonding agent or glass. The term "pellet" or "pellets" as set forth in the specification and subjoined claims with reference to the abrasive grains, is used in its broad sense to connote relatively small size regular geometrically-shaped abrasive grains in the form of tubes, cylinders, prisms, and the like as will be more fully described in a latter portion of the specification. The preferred compositions generally contain from about 70% to about 90% aluminum oxide and from about 30% to about 10% glass. In addition to the foregoing, a small percentage of conventional impurities ranging up to about 1% can also be present.

It will be understood that the composition of the abrasive pellets as set forth in the specification and subjoined claims are expressed, unless otherwise specified, in terms of percentages by weight.

The aluminum oxide constituent in the abrasive pellets can be derived from calcined aluminum hydrates or from scrap alumina material such as spent catalyst supports, for example. The alumina in the abrasive pellets is present in a crystalline form wherein the crystals are of extremely fine size, that is, less than about 5 microns and preferably less than about 2 microns. The crystalline alumina particles are tenaciously held together to form the abrasive pellets by means of a continuous vitreous bonding phase comprising a silicate glass having a final fired composition broadly ranging as follows:

COMPOSITION OF BONDING AGENT

| Oxide: | Percent by weight |
|---|---|
| Alumina | 10 to 25 |
| Silicon dioxide | 50 to 70 |
| Calcium oxide | 5 to 15 |
| Magnesium oxide | 10 to 20 |
| Minor impurities | Up to 3 |

The magnesium oxide constituent in the glass bonding agent acts to inhibit the growth of the alumina crystals during the subsequent firing of the preshaped and presized abrasive pellets.

Various raw materials can be employed in combinations of mixtures or blends to arrive at the resultant oxide composition of the glass bonding agent as set forth in the foregoing table. For example, the alumina can be added as the oxide, hydrate, clay, mullite, or other alkali-free aluminous material. The silica can be introduced as silica, clay, talc, wollastonite, or other alkali-free siliceous mineral. Calcium oxide can be added as limestone, dolomite, wollastonite, or other lime-containing mineral and magnesium oxide may be added as electrically-fused magnesia, periclase, brucite, talc, or magnesium carbonate.

The method of making the abrasive pellets is schematically shown in FIGURE 1 wherein appropriate quantities of the finely comminuted alumina and raw materials for forming the glass bonding agent are added to a combination pulverizing and mixing apparatus, such as for example, a ball mill, to which a quantity of water is added so as to form a slurry or slip. The water facilitates the grinding, mixing, and plasticizing of the ingredients and can be varied to achieve the optimum operation. Generally, water can be introduced in amounts ranging from about 30% to 150%, based on the dry batch.

The materials are milled for a period of time sufficient to form a substantially uniform mixture and to reduce the particle size of the alumina to less than about 5 microns, and preferably less than about 2 microns. This can conventionally be achieved in a standard ball mill in a period of about 18 hours.

The resultant ball milled slip is thereafter transferred from the ball mill to a filter press wherein excess water is removed so as to produce a plastic mass of the desired consistency. The filter cake is then extruded or formed by other means into discrete preshaped and presized pellets which are thereafter dried to remove the balance of the water and followed by firing at an elevated temperature. Preshaping and presizing of the abrasive pellets can be conveniently achieved by employing a de-airing type extruder, for example, whereby the moist filter cake material is extruded in the form of elongated columns which are cut at specified intervals to provide the requisite length and size of the resultant pellets. The pellets derived from the extrusion operation are of a general cylindrical or prismatic configuration having a cross sectional shape which is uniform along its entire length. The cross sectional shape of the pellet can be of a round, square, hexagonal, triangular or tubular configuration, for example. The cylindrical or prismatic configuration of the abrasive pellet is preferred in view of the improved bonding characteristics obtained thereby on subsequent formation of a grinding wheel therefrom. The abrasive pellets having a regular-geometric configuration are preshaped in a range of sizes corresponding to the conventional grain sizes of abrasive grains for grinding wheels depending on the specific grinding characteristics desired. The pellets formed generally have a size in their minor dimension ranging from up to about 0.130 inch to about 0.030 inch and which may also include a small percentage of fines, such as up to about 10%.

A typical abrasive pellet 10 is illustrated in FIG. 2 and comprises a cylindrical rod. A prismatic pellet 12 having a square cross-sectional shape is illustrated in FIG. 3. It will be understood that the configurations of the abrasive pellets shown in FIGS. 2 and 3 are provided for the purposes of illustration and are not limiting with respect to alternate regular geometrical shapes which can be satisfactorily employed for the manufacture of abrasive grinding wheels in accordance with the present invention.

After extrusion and sizing of the pellets, they are subjected to a drying operation as schematically shown in FIGURE 1, wherein substantially all of the residual moisture is removed providing therewith substantially dry and relatively hard abrasive pellets. The dried abrasive pellets can thereafter be directly charged to a furnace for vitrification and bonding of the pellet into a dense, hard, and high strength mass, or alternatively, can be subjected to a preliminary tumbling operation as shown in phantom in FIGURE 1 wherein the dried pellets are tumbled to effect a slight rounding of the corner edges thereof forming therewith an abrasive pellet 14 having a typical configuration as shown in FIG. 4.

The abrasive pellets, whether or not subjected to the intervening tumbling operation, are charged into the furnace and fired at a temperature ranging from about 2570° F. to about 3002° F. which corresponds to pyrometric cones ranging from about number 15 to about number 30. The length of time that the abrasive pellets are fired and the particular firing temperature employed are dependent upon the specific composition of the glass bonding agent and the relative proportions of the bonding agent and alumina crystals contained therein.

The resultant fired abrasive pellets are thereafter passed through a suitable crusher, for example, whereby any pellets which may have become adhered to each other during the firing operation are separated into individual pellets. The separation operation is controlled so as not to affect the size or inflict damage to the individual pellets but merely to separate the pellets from each other. To assure complete separation of the pellets, it is desirable to screen the pellets from the crusher and recycle any agglomerated pellets to the crusher for a second crushing operation. The resultant screened pellets are characterized by their uniformity in shape and size and the extremely fine particle size of the crystalline alumina constituent therein.

The density of the resultant fired abrasive pellets preferably is in the range of from at least about 2.75 to about 3.70 grams per cubic centimeter, dependent upon the firing temperature and the proportion of alumina contained therein. This relationship between firing temperature and composition is illustrated in FIG. 5. As noted in this figure, the density of the pellets increases as the proportion of alumina is increased. In addition, as the temperature of firing increases for a fixed 30-minute soak period, the density increases until a maximum density is achieved, after which the density of the pellets commences to decrease as indicated by the convex configuration of the curves representing alumina contents of 50%, 60%, and 70%. The curves representing alumina contents of 80%, 90%, and 95% are shown as asymptotically approaching a maximum density. In view of the foregoing relationship it is preferred that for a given composition and period of firing, the temperature is controlled so as to produce an abrasive particle having a density of at least 2.75 gm./cc. which provides superior physical properties and grinding characteristics.

The resultant abrasive particles derived from the screening operation can be employed for the manufacture of high speed, high strength, heavy-duty grinding wheels wherein the regularly geometrically shaped abrasive pellets or mixtures thereof of the appropriate grain size distribution are tenaciously bonded by means of a suitable thermosetting resin. The formation of the grinding wheel can be achieved by the conventional cold and hot pressing techniques or preferably, by a displacement molding method as set forth in United States Patent No. 2,860,961 which provides the advantage of not requiring excessive pressures for forming the grinding wheel. In comparison, relatively high pressures are necessary in conventional cold and hot pressing operations wherein the abrasive particles are subjected to extremely high stresses which have a tendency to damage or otherwise fracture the abrasive pellets.

Grinding wheels employing the abrasive pellets made in accordance with the method comprising the present invention generally contain from about 40% to about 64% by volume of the abrasive pellets and from about 36% to about 60% by volume of a suitable bonding material including various amounts of binder resins, fillers, plasticizers, pores, and other additives and including a reinforcing network, if desired. Suitable filler materials which can be satisfactorily employed include, for example, powdered cryolite, metallic sulfides, and others which are inert or which improve the cutting efficiency of the resultant abrasive grinding wheel. If desired, the bond composition can also contain lime and where furfuraldehyde is employed for wetting the surfaces of the abrasive pellets the presence of lime is recommended.

The binder resins which can be satisfactorily employed for forming a resinoid bonded abrasive grinding wheel include resins of the so-called thermosetting type which are heat hardenable and heat convertible into a hard, strong bond. Resins of this type are well known in the art and include phenol aldehyde resins, cresol aldehyde resins, resorcinol aldehyde resins, urea aldehyde resins, melamine formaldehyde resins, furfuryl alcohol resins, and the like, as well as mixtures thereof. Of these, the condensation product of phenol itself with formaldehyde constitutes the preferred binding resin. In order to provide improved adhesion of the abrasive pellets to the bonding agent, it is preferred to preliminarily wet the surfaces of the abrasive pellets with a solvent for the thermosetting resin to be employed, such as furfural, for example. It is also contemplated that the thermosetting bonding resin can be modified with small quantities of other resinous materials such as epoxy resins, vinyl resins including vinyl chloride, vinyl butral, vinyl formal, vinyl acetate, and others and may contain various percentages of cross-linking aids such as hexamethylene tetramine, or paraformaldehyde, and suitable solvents or plasticizers such as furfuraldehyde and propylene sulfite. Other plasticizers such as cresol, furfuryl alcohol, or the like, can be employed if desired.

As an example of a mold adapted to making grinding wheels in accordance with the displacement method disclosed in the aforementioned patent, is shown in FIG. 6 and comprises a base plate 16 having a vacuum chamber 18 which is provided with a suction tube 20 for evacuating the air therefrom. A foraminous top plate 22 is securely fastend to the base plate 16 and employs a gasket 24 therebetween, forming an air-tight seal. A circular split band outer mold member 26 is provided with a pair of projecting flaps 28 which can be secured by suitable fastening means to form a continuous cylindrical mold surface. A suitable seal is preferably employed between the outer mold member and the top plate to provide a vacuum type seal therebetween.

Appropriate alignment and positioning of the outer mold member 26 relative to the top plate 22 is provided by a series of abutments 30 affixed to and projecting upwardly from the top plate. A central core 32 is disposed concentrically with the outer mold member and forms the hole or arbor through the abrasive wheel. The core can also be comprised of a suitable arbor which is permanently molded to the abrasive grinding wheel forming an integral part thereof. In the specific embodiment shown in the drawing, the core is provided with an overlying fibrous sleeve or collar 34 to prevent adhesion of the bond material to the core.

The base of the annular region between the core and outer mold member is provided with an annular barrier ring 36 which is pervious to air but which is substantially impervious to or will resist penetration by the bonding resins. The barrier ring 36 is disposed and supported on a retainer ring 38 of a fairly coarse wire construction which is disposed in overlying relationship on the top plate having a plurality of suction bores 40 therethrough.

In the formation of the grinding wheel, the desired portion of abrasive pellets is placed in the annular chamber on top of the barrier ring and is vibrated or otherwise tapped to form a relatively tightly compacted abrasive layer 42. Thereafter, an appropriate quantity of a pre-mixed bonding material 44 of the desired composition is placed above the abrasive pellet layer and vacuum is applied to the suction tube whereby air is withdrawn through the suction bores and out of the chamber concurrently drawing the bonding layer downwardly through the abrasive pellet layer and substantially completely filling the voids therebetween.

The bonding material 44 can be applied over the abrasive layer either at room temperature or at a slightly elevated temperature below that at which the bonding material will cure rapidly. The abrasive pellets and mold can also be preliminarily heated whereby penetration of the bonding material is achieved rapidly and the cure is quickly initiated whereby the bonding material commences to thicken shortly after substantially all of the voids in the abrasive layer have been filled therewith. As a typical example, a phenol formaldehyde resin bonding agent can be heated to a temperature ranging from about 165° F. to about 180° F. incorporating therein a hexamethylene tetramine hardener and the abrasive mixture can be heated to a temperature ranging from about 200° F. to about 350° F. to which the heated bonding agent is applied. By employing a preliminarily heated mold and bonding agent, curing of the bonding agent is rapidly achieved which enables the partly cured abrasive grinding wheel to be removed from the mold and subjected to further curing at an elevated temperature to complete the curing of the bonding agent.

Resinoid bonded abrasive wheels incorporating the pre-sized, preshaped alumina abrasive pellets which are devoid of incipient cracks or fissures and which contain alumina of a crystalline size less than 5 microns, and preferably less than about 2 microns are eminently suitable for heavy-duty grinding operations such as for snagging steel and the like. Such grinding wheels made in accordance with the displacement method hereinbefore described and shown, are particularly satisfactory because of their relatively high density, high strength, and substantially complete absence of any pores therein.

The following example is provided of a typical abrasive pellet and grinding wheel made therefrom employing the displacement technique which is provided to further illustrate the present invention and is not intended to be limiting in any way.

*Example 1*

An abrasive pellet was made containing 78.7 weight percent of fine sized crystalline alumina and 21.3 percent by weight of a glass bonding agent. The oxide composition of the resultant fired glass bonding agent is as follows:

| Oxide: | Percent by weight |
|---|---|
| $Al_2O_3$ | 16.8 |
| $SiO_2$ | 58.3 |
| CaO | 9.3 |
| MgO | 15.6 |

To achieve the exemplary oxide composition of the glass bonding agent as set forth in the foregoing table, a mixture was prepared comprising 48.2 pounds tremolitic talc, 8.3 pounds calcium carbonate, 3.5 pounds silica, and 40.0 pounds china clay to which the appropriate amount of alumina was added and the resultant mixture was subjected to ball milling with 120 pounds of water for a period of eighteen hours. The resultant ball milled slip was thereafter filtered forming a filter cake containing about 16% water which was extruded in a de-airing type extruder to a series of cylindrical pellets having a diameter of about ⅛ inch and a length of about ⅛ to ¼ inch. All of the abrasive pellets passed through a 6 mesh screen. The extruded pellets were thereafter dried at about 250° F. for a period of about 24 hours whereby the residual moisture content was reduced to less than 0.1%. The dried extruded abrasive pellets were thereafter subjected to firing at a temperature of about 2710° F. corresponding to pyrometric cone No. 18 for a period of 22 hours. The resultant fired particles were thereafter passed through a roll crusher to separate individual pellets which had become adhered to each other.

The resultant abrasive pellets had a hardness on the Moh's scale of about 9 units and had a modulus of rupture in the order of about 45,000 p.s.i. The average density of the abrasive pellets was about 3.33 grams per cubic centimeter. A visual examination of the surfaces of any abrasive pellets showed the complete absence of any incipient cracks or fissures in the surfaces and body of the individual pellets.

Two abrasive grinding wheels having an outside diameter of 12 inches, an inside diameter of 2 inches, and a thickness or width of 1 inch were made in accordance with the displacement molding technique hereinbefore described wherein 62% by volume of the abrasive pellets were employed and tenaciously bonded by a bonding agent comprising:

BONDING AGENT

| Ingredient: | Volume percent |
|---|---|
| Powdered A-stage phenolic resin (Varcum 3025) | 43.3 |
| Powdered potassium sulfate | 13.5 |
| Powdered zinc sulfide | 5.8 |
| Powdered lime | 7.0 |
| Powdered Geon 202 (mixture of polyvinyl chloride and polyvinylidene chloride) | 7.7 |
| Furfuraldehyde | 19.1 |
| Trichlorobenzene | 3.6 |

The resultant resinoid bonded abrasive grinding wheels were cured at a temperature of about 350° F. for about 15 hours. A test wheel designated "A" incorporated cylindrical abrasive pellets having a diameter of 0.114 inch and a length of ¼ inch. A test wheel designated as "B" incorporated similar abrasive pellets which were ⅛ inch long. A third test wheel designated "C" was prepared having standard fused alumina grains of 10, 12, and 14 mesh for comparative purposes.

The grinding wheels were thereafter employed for test grinding a type 302 stainless steel while operating under a contact load of 135 pounds and at a velocity of 12,000 surface feet per minute (s.f.p.m.). The results of the tests comprising the average of a series of runs made are tabulated in Table I:

TABLE I

| Test Wheel | Wheel Wear, Cu. In. Per Hour | Steel Removed, Pounds Per Hr. | S/W | S²/W |
|---|---|---|---|---|
| A | 24.6 | 81.3 | 3.31 | 268 |
| B | 43.5 | 98.6 | 2.27 | 224 |
| C | 67.1 | 87.4 | 1.28 | 114 |

In the above table, the two columns on the right are indicative of the grinding efficiency of the abrasive wheel. The factor S/W comprises the quotient of dividing the quantity of steel removed in pounds per hour by the wear of the wheel in cubic inches per hour. The last column is a quality number employed for comparative purposes and consists of squaring the pounds per hour of steel removed divided by the wheel wear in cubic inches per hour. As will be noted from the quality factor S²/W obtained on the grinding wheels designated "A" and "B" made in accordance with the example, the abrasive pellets comprising the present invention provide excellent grinding efficiency and high rate of material removal in comparison to the wear rate of the wheel. The quality factors of the test wheels "A" and "B" are substantially twice as good as the quality factor of test wheel "C." Typical quality numbers (S²/W) for fused alumina wheels of the type heretofore known generally range from about 100 to 130 which are significantly lower than the quality number of the grinding wheel made in accordance with the preferred practice of the present invention.

Additional abrasive pellets and grinding wheels designated D, E, and F were prepared for test in accordance with the general procedure outlined in Example I above employing the same bonding agent composition and abrasive pellet size as employed in test wheel "A" but employing a higher proportion of alumina. Test wheels "D" and "E" each contained 88% alumina but are distinguishable by the crystal size of the alumina crystals in the pellets. Test wheel "F" employed alumina crystals of 1 micron corresponding to test wheel "E" but employed a lower alumina content of 85%. The results of the tests are tabulated in Table II and are presented in the same form as the test results presented in Table I.

TABLE II.—GRINDING EFFICIENCY VS. ALUMINA CRYSTALLINE SIZE

| Test Wheel | Wheel Wear, Cu. In. Per Hour | Steel Removed, Pounds Per Hr. | S/W | S²/W |
|---|---|---|---|---|
| D (88% 10 microns) | 31.3 | 42.7 | 1.36 | 58 |
| E (88% 1 micron) | 63.7 | 88.1 | 1.38 | 122 |
| F (85% 1 micron) | 58.9 | 113.3 | 1.93 | 218 |

(Note.—D and E tested at a 790 lb. contact load on a 3 inch wide wheel; F tested at 710 lb. contact load on a 3 inch wide wheel.)

It is apparent from a comparison of the data presented in Table II that test wheel E having an average alumina crystalline size of about 1 micron had significantly superior grinding characteristics as expressed in terms of the quality factor S²/W in comparison to the test wheel "D" of the same composition but which had an alumina crystalline structure of an average size of 10 microns and which was run under the same test conditions. The data obtained on the test wheel F are provided to further illustrate the excellent grinding efficiency of the abrasive pellets comprising the present invention, having an average alumina crystalline size of about 1 micron. As noted in Table II, test wheel "F" is of a different composition and was run under different test conditions than the test wheels "D" and "E."

An additional series of test wheels designated as "G," "H," and "I" were prepared to illustrate the effect of the density of the abrasive pellets on the grinding efficiency of a grinding wheel made therefrom. The composition of the abrasive pellets employed in the test wheels "G," "H" and "I" corresponds to that disclosed in connection with the abrasive pellets prepared in accordance with the general procedure outlined in Example I. The abrasive pellets of test wheels "G," "H" and "I" each contained about 78.7 percent alumina and about 21.3 percent glass bonding agent. The densities of the abrasive pellets in the test wheel "G" correspond substantially to those of the test wheel "A" made in accordance with Example I. The results of the test conducted on test wheels "G," "H" and "I" are tabulated in Table III.

TABLE III.—GRINDING EFFICIENCY VS. PELLET DENSITY

| Test Wheel | Pellet Density, gm./cc. | Firing Temp., Pyrometric Cone | Wheel Wear, Cu. In. Per Hr. | Steel Removed, Pounds Per Hr. | S/W | S²/W |
|---|---|---|---|---|---|---|
| G | 3.33 | 18 | 32.97 | 102.88 | 3.12 | 321 |
| H | 3.28 | 17½ | 31.20 | 98.22 | 3.15 | 309 |
| I | 3.22 | 16½ | 32.04 | 87.86 | 2.74 | 241 |

As will be noted in Table III, the density of the abrasive pellets was highest for the test wheel "G" and lowest for the test wheel "I." This variation in density was achieved by employing different firing temperatures during the manufacture of the abrasive pellets. A comparison of the quality numbers represented by the quality factor S²/W indicates a progressive decrease in the grinding efficiency of the grinding wheels as the density of the abrasive pellets decreases. The grinding efficiency of the test wheel "I" however, is still significantly superior to that obtainable on abrasive grinding wheels incorporating fused alumina abrasive grains therein of the type heretofore known when tested under similar test conditions.

It is for this reason that the density of the abrasive pellets comprising the present invention be at least 2.75 grams per cubic centimeter, and preferably a density corresponding substantially to the maximum obtainable for the particular composition employed.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. An abrasive pellet having a regular geometrical configuration suitable for use in the manufacture of abrasive articles such as grinding wheels and the like, consisting essentially of from about 50% to about 95% crystalline alumina having an average crystal size of less than about 5 microns, and from about 5% to about 50% of a glass bonding agent, said pellet comprising a dense mass consisting of a discontinuous alumina phase tenaciously bonded together by a continuous vitreous glass phase, said pellet characterized as having a density of at least about 2.75 grams per cubic centimeter and a structure substantially devoid of cracks and fissures therein, said pellets having a preshaped, regular geometrical configuration and a size in its major dimension substantially greater than in its minor dimension, said size in its minor dimension ranging from about 0.030 inch to about 0.130 inch, said glass bonding agent consisting essentially of the following constituents expressed in terms of percentages by weight:

| | Percent |
|---|---|
| Alumina | 10 to 25 |
| Silicon dioxide | 50 to 70 |
| Calcium oxide | 5 to 15 |
| Magnesium oxide | 10 to 20 |
| Minor impurities | up to 3 |

2. An abrasive pellet having a regular geometrical configuration suitable for use in the manufacture of abrasive articles such as grinding wheels and the like, consisting essentially of from about 50% to about 95% crystalline alumina having an average crystal size of less than about 5 microns, and from about 5% to about 50% of a glass bonding agent, said pellet comprising a dense mass consisting of a discontinuous alumina phase tenaciously bonded together by a continuous vitreous glass phase, said pellet characterized as having a density of at least about 2.75 grams per cubic centimeter and a structure substantially devoid of cracks and fissures therein, said pellets having a preshaped, regular geometrical configuration, said glass bonding agent consisting essentially of the following constituents expressed in terms of percentages by weight:

| | Percent |
|---|---|
| Alumina | 10 to 25 |
| Silicon dioxide | 50 to 70 |
| Calcium oxide | 5 to 15 |
| Magnesium oxide | 10 to 20 |
| Minor impurities | up to 3 |

3. An abrasive pellet having a regular geometrical configuration suitable for use in the manufacture of abrasive articles such as grinding wheels and the like, consisting essentially of from about 70% to about 90% crystalline alumina having an average crystal size of less than about 2 microns, and from about 10% to about 30% of a glass bonding agent, said pellet comprising a dense mass consisting of a discontinuous alumina phase tenaciously bonded by a continuous vitreous glass phase, said pellet characterized as having a density of at least about 2.75 grams per cubic centimeter and a structure substantially devoid of cracks and fissures therein, said pellets having a preshaped regular geometrical configuration, said glass bonding agent consisting essentially of the following constituents expressed in terms of percentages by weight:

| | Percent |
|---|---|
| Alumina | 10 to 25 |
| Silicon dioxide | 50 to 70 |
| Calcium oxide | 5 to 15 |
| Magnesium oxide | 10 to 20 |
| Minor impurities | up to 3 |

4. An abrasive pellet having a regular geometrical configuration suitable for use in the manufacture of abrasive articles such as grinding wheels and the like consisting essentially of from about 70% to about 90% crystalline alumina having an average crystal size of less than about 2 microns, and from about 10% to about 30% of a glass bonding agent, said pellet comprising a dense mass consisting of a discontinuous alumina phase tenaciously bonded by a continuous vitreous glass phase, said pellet characterized as having a density of at least about 2.75 grams per cubic centimeter and a structure substantially devoid of cracks and fissures therein, said pellets having a preshaped regular geometrical configuration, and a size in its minor dimension ranging from about .030 inch up to about .130 inch, said glass bonding agent consisting essentially of the following constituents expressed in terms of percentages by weight:

| | Percent |
|---|---|
| Alumina | 10 to 25 |
| Silicon dioxide | 50 to 70 |
| Calcium oxide | 5 to 15 |
| Magnesium oxide | 10 to 20 |
| Minor impurities | up to 3 |

5. An abrasive pellet having a regular geometrical configuration suitable for use in the manufacture of abrasive articles such as grinding wheels and the like, consisting essentially of from about 70% to about 90% crystalline alumina having an average crystal size of less than about 2 microns, and from about 10% to about 30% of a glass bonding agent, said pellet comprising a dense mass consisting of a discontinuous alumina phase tenaciously bonded by a continuous vitreous glass phase, said pellet characterized as having a density of at least about 2.75 grams per cubic centimeter and a structure substantially devoid of cracks and fissures therein, said pellets having a preshaped regular geometrical configuration, and a size in its minor dimension ranging from about .030 inch up to about .130 inch, said pellets further characterized as having a hardness of about 9 on the Mohs' scale, said glass bonding agent consisting essentially of the following constituents expressed in terms of percentages by weight:

| | Percent |
|---|---|
| Alumina | 10 to 25 |
| Silicon dioxide | 50 to 70 |
| Calcium oxide | 5 to 15 |
| Magnesium oxide | 10 to 20 |
| Minor impurities | up to 3 |

6. The method of making an abrasive pellet suitable for use in the manufacture of abrasive articles such as grinding wheels and the like, comprising the steps of providing a finely divided alumina powder having an average particle size of less than about 5 microns and a glass bonding agent mixed in the proportions ranging from about 50% to about 95% by weight alumina, said glass bonding agent consisting essentially of the following constituents expressed in terms of percentages by weight:

| | Percent |
|---|---|
| Alumina | 10 to 25 |
| Silicon dioxide | 50 to 70 |
| Calcium oxide | 5 to 15 |
| Magnesium oxide | 10 to 20 |
| Minor impurities | up to 3 | preshaping and presizing said plastic mass into a pellet having a regular geometrical configuration and a size in its minor dimension ranging from about .030 to about .130 inch, drying the preshaped and presized said pellet and therafter firing the dried said pellet at a temperature ranging from about 2570° F. to about 3002° F. for a period of time sufficient to form a tenaciously bonded integral pellet having a density of at least about 2.75 grams per cubic centimeter.

7. The method of making an abrasive pellet suitable for use in the manufacture of abrasive articles such as grinding wheels, and the like, comprising the steps of providing a finely divided alumina powder having an average particle size of less than about 5 microns and a glass bonding agent mixed in the proportions ranging from about 50% to about 95% by weight alumina and from about 5% to about 50% by weight of said glass bonding agent, said glass bonding agent consisting essentially of a mixture of ingredients to yield the following resultant oxide composition expressed in terms of percentages by weight:

| | Percent |
|---|---|
| Alumina | 10 to 25 |
| Silicon dioxide | 50 to 70 |
| Calcium oxide | 5 to 15 |
| Magnesium oxide | 10 to 20 |
| Minor impurities | up to 3 | blending said alumina and said bonding agent in the presence of water forming therewith a slip, removing an undesired portion of said water forming a plastic mass of the desired consistency, preshaping and presizing said plastic mass into a pellet having a regular geometrical configuration, drying the preshaped and presized said pellet and thereafter firing the dried said pellet at a temperature ranging from about 2570° F. to about 3002° F. for a period of time sufficient to form a tenaciously bonded integral pellet having a density of at least about 2.75 grams per cubic centimeter.

8. The method of making an abrasive pellet suitable for use in the manufacture of abrasive articles such as grinding wheels and the like, comprising the steps of providing a finely divided alumina powder having an average particle size of less than about 2 microns and a glass bonding agent mixed in the proportions ranging from about 70% to about 90% by weight alumina and from about 10% to about 30% by weight of said glass bonding agent, said glass bonding agent consisting essentially of the following constituents expressed in terms of percentages by weight:

| | Percent |
|---|---|
| Alumina | 10 to 25 |
| Silicon dioxide | 50 to 70 |
| Calcium oxide | 5 to 15 |
| Magnesium oxide | 10 to 20 |
| Minor impurities | up to 3 | blending said alumina and said bonding agent in the presence of water forming therewith a slip, removing an undesired portion of water from said slip forming therewith a plastic mass, preshaping and presizing said plastic mass into a pellet having a regular geometrical configuration, drying the preshaped and presized said pellet and thereafter firing the dried said pellet at a temperature ranging from about 2570° F. to about 3002° F. for a period of time sufficient to form a tenaciously bonded integral pellet having a density of at least about 2.75 grams per cubic centimeter and a size in its minor dimension ranging from about .030 to about .130 inch.

9. An abrasive grinding wheel comprising from about 40% to about 64% by volume of a plurality of abrasive pellets having a regular geometrical configuration and the balance a thermosetting resinous bonding material for tenaciously bonding said abrasive pellets together, each of said abrasive pellets comprising from about 50% to about 95% by weight crystalline alumina having an average crystal size of less than about 5 microns, and from about 5% to about 50% by weight of a glass bonding agent, said pellet comprising a dense mass consisting of a discontinuous alumina phase tenaciously bonded by a continuous glass phase, said pellet characterized as having a density of at least about 2.75 grams per cubic centimeter and a structure substantially devoid of cracks and fissures therein, said pellets having a preshaped regular geometrical configuration, said glass bonding agent consisting essentially of the following constituents expressed in terms of percentages by weight:

| | Percent |
|---|---|
| Alumina | 10 to 25 |
| Silicon dioxide | 50 to 70 |
| Calcium oxide | 5 to 15 |
| Magnesium oxide | 10 to 20 |
| Minor impurities | up to 3 |

10. An abrasive grinding wheel of the resin bond type which is fabricated from abrasive pellets bonded to each other by a thermosetting resinous bonding material into a strong self-sustaining wheel suitable for snagging steel, said abrasive pellets constituting from about 40% to about 64% by volume of said wheel, said abrasive pellets consisting essentially of from about 50% to about 95% crystalline alumina having an average crystal size of less than about 5 microns and from about 5% to about 50% of a bonding agent consisting of a silicate glass, said pellets comprising a dense mass consisting of a discontinuous phase comprising said crystalline alumina tenaciously bonded together by a continuous phase consisting of said silicate glass, each of said abrasive pellets having a preshaped regular geometrical configuration and a size in their major dimension substantially greater than in their minor dimension, said size in their minor dimension ranging from about 0.030 inch to about 0.130 inch.

11. An abrasive wheel in accordance with claim 10 wherein said crystalline alumina is of an average crystal size of less than about 2 microns.

12. An abrasive wheel in accordance with claim 10 wherein said abrasive pellets are cubic in shape.

13. An abrasive wheel in accordance with claim 10 wherein said abrasive pellets are cylindrical in shape.

14. An abrasive wheel in accordance with claim 10 wherein said abrasive pellets are tubular in shape.

15. An brasive wheel in accordance with claim 10 wherein said abrasive pellets are prismatic in shape.

References Cited by the Examiner

UNITED STATES PATENTS

| | | | |
|---|---|---|---|
| 2,527,044 | 10/50 | Walton et al. | 51—308 |
| 2,718,577 | 9/55 | Sherk | 106—47 |
| 2,725,286 | 11/55 | Coes | 51—298 |
| 2,830,884 | 4/58 | Smiley | 51—308 |
| 2,877,103 | 3/59 | Lane | 51—308 |
| 2,947,056 | 8/60 | Csordas et al. | 51—309 |
| 2,961,328 | 11/60 | Babcock et al. | 106—52 |
| 2,978,850 | 4/61 | Gleszer | 51—298 |
| 2,986,455 | 5/61 | Sandmeyer | 51—296 |
| 3,079,243 | 2/63 | Ueltz | 51—298 |

MORRIS LIEBMAN, *Primary Examiner.*

JOHN R. SPECK, ALEXANDER H. BRODMERKEL, *Examiners.*